United States Patent [19]

Minakuchi

[11] Patent Number: 4,593,985
[45] Date of Patent: Jun. 10, 1986

[54] AUTOMATIC PHOTOGRAPHING DEVICE FOR VIDEO CAMERA

[75] Inventor: Tadashi Minakuchi, Tokyo, Japan

[73] Assignee: Asahi Kogaku Kogyo Kabushiki Kaisha, Tokyo, Japan

[21] Appl. No.: 668,346

[22] Filed: Nov. 5, 1984

[30] Foreign Application Priority Data

Nov. 7, 1983 [JP] Japan .................... 58-209531

[51] Int. Cl.$^4$ .................... G03B 1/00; G03B 17/40
[52] U.S. Cl. .................... 354/238.1; 354/266; 352/175
[58] Field of Search .................. 354/238.1, 266, 267.1; 352/169–171, 174, 175; 178, 179

[56] References Cited

U.S. PATENT DOCUMENTS

| | | | |
|---|---|---|---|
| 3,692,393 | 9/1972 | Anderl | 352/178 X |
| 4,046,465 | 9/1977 | Toyama et al. | 354/238.1 X |
| 4,096,500 | 6/1978 | Lermann et al. | 352/169 X |

Primary Examiner—William B. Perkey
Attorney, Agent, or Firm—Sughrue, Mion, Zinn, Macpeak, and Seas

[57] ABSTRACT

An automatic photographing device for a video camera which permits the photographer to enter the picture before the picture recording operation is started and times the picture recording operation to automatically stop after a predetermined period of time. The output of a trigger switch is applied through serially connected first and second timer sections. The first timer section establishes a delay time after the trigger switch is turned on until the picture recording operation commences, while the second timer section establishes the picture recording time. The output of the second timer section controls the operation of the recording device of a photographing section. Further, a display device is provided for indicating distinctively that the delay mode is in effect or that the picture photographing operation is in effect.

4 Claims, 4 Drawing Figures

AUTOMATIC PHOTOGRAPHING DEVICE FOR VIDEO CAMERA

BACKGROUND OF THE INVENTION

The present invention relates to an automatic photographing device for a video camera.

A conventional video camera, unlike a still camera, is not provided with a timer. Accordingly, it is substantially impossible for the photographer to leave the camera and get into the picture photographed by the video camera. This difficulty may be eliminated by employment of a remote control device. However, that approach is not popularly employed because it requires additional parts, for instance, a remote control cable. Further, setting of the remote control device is rather troublesome.

SUMMARY OF THE INVENTION

In view of the foregoing, the invention provides an automatic photographing device for a video camera in which selection between the manual photographing mode and the automatic photographing mode can be made simply by operating an automatic/manual switch, and if a trigger switch is turned on with the automatic/manual switch set to the automatic position, a timed photographing mode is established whereby the photographer can get into the picture before recording starts and the recording operation is automatically terminated.

DESCRIPTION OF THE PREFERRED EMBODIMENTS

Preferred embodiments of the invention will now be described with reference to the accompanying drawings.

Figure 1:
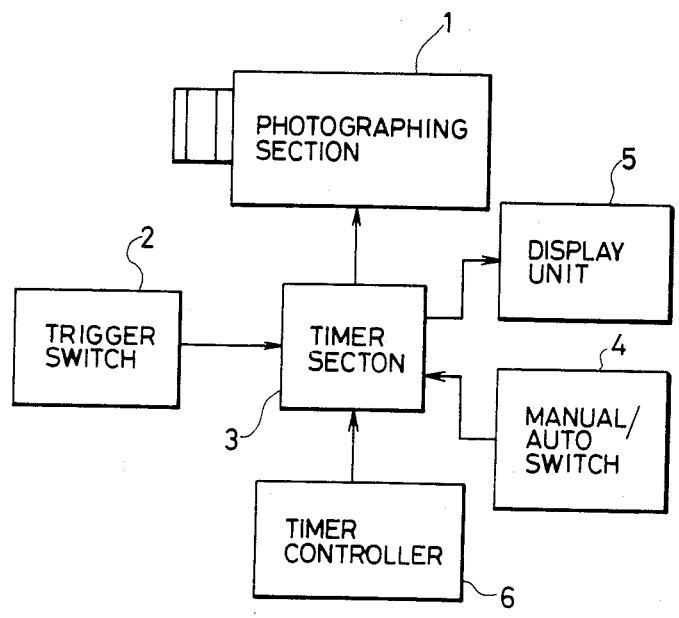
FIG. 1 is a block diagram used for a description of the operation of an automatic photographing device for a video camera according to the invention in an automatic photographing state.
Figure 2:
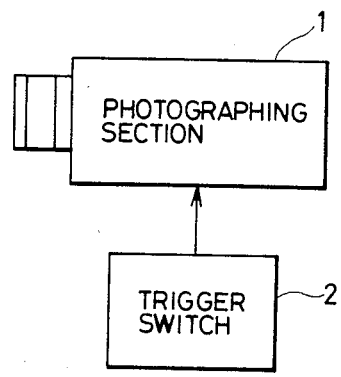
FIG. 2 is a block diagram used for a description of the operation of the device according to the invention in a manual photographing state.

FIG. 1 shows the configuration of an automatic photographing device according to the invention in an automatic photographing state, and FIG. 2 shows the configuration of the device in a manual photographing state.

The automatic photographing device for a video camera according to the invention, which is generally built into a video camera, includes a photographing section 1, a trigger switch 2 for controlling the period of time which elapses from the time instant the trigger switch 2 is turned on until a picture recording operation starts and a period of time which elapses from the time instant a picture recording operation starts until the picture recording operation stops, a timer controller 6 for setting the control times of the timer section 3, a switch 4 for selecting between a manual photographing operation and an automatic photographing operation, and a display unit 5 for displaying the state of the photographing section 1.

When it is desired to perform automatic photographing operation, as shown in FIG. 1, first the switch 4 is set for the automatic photographing operation and the trigger switch 2 is turned on so that the automatic photographing operation is started. However, is should be noted that the timer section 3 provides a signal so that the photographing section 1 does not immediately start the photographing operation. Instead, the timer controller 6 causes the photographing section 1 to start the photographing operation a predetermined period of time after the trigger switch 2 is turned on. The display unit 5 detects the signal from the timer section 3 and in response provides an indication that the picture recording operation is delayed. After the predetermined period of time has been passed, the photographing section 1 starts the picture recording operation in response to a signal from the timer section 3. The picture recording time can be adjusted to a desired value by the timer controller 6.

The display unit 5 detects the signal from the timer section 3 and in response provides an indication that the photographing section is in the picture recording state.

After a predetermined picture recording time has passed, the photographing section 1 stops the picture recording operation in response to an output signal from the timer section 3, and the display unit 5 indicates the fact that the recording operation has stopped.

In the case where it is desired to perform manual photographing, as shown in FIG. 2, the picture recording start and stop of the photographing section 1 are controlled by the trigger switch 2 only, and the timer section 3 is not in operation because the switch 4 has been set for the manual photographing operation.

Figure 3:
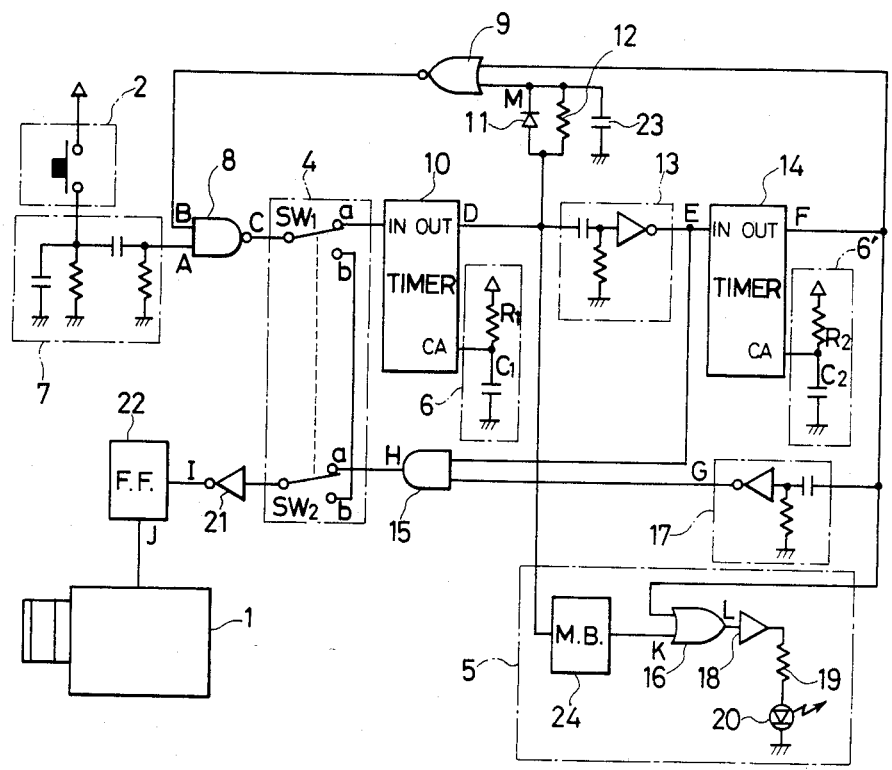
FIG. 3 is a circuit diagram of a specific example of the automatic photographing device for a video camera according to the invention.
Figure 4A:
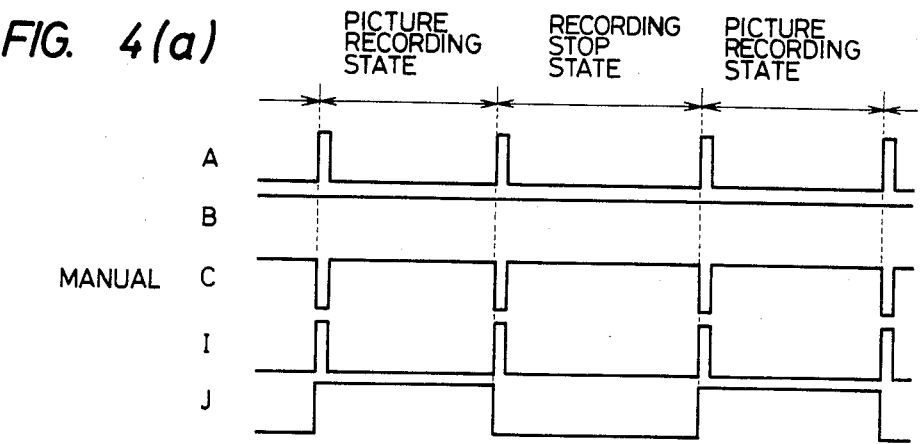
FIG. 4 is a timing chart used for a description of the operation of the circuit in FIG. 3.
Figure 4B:
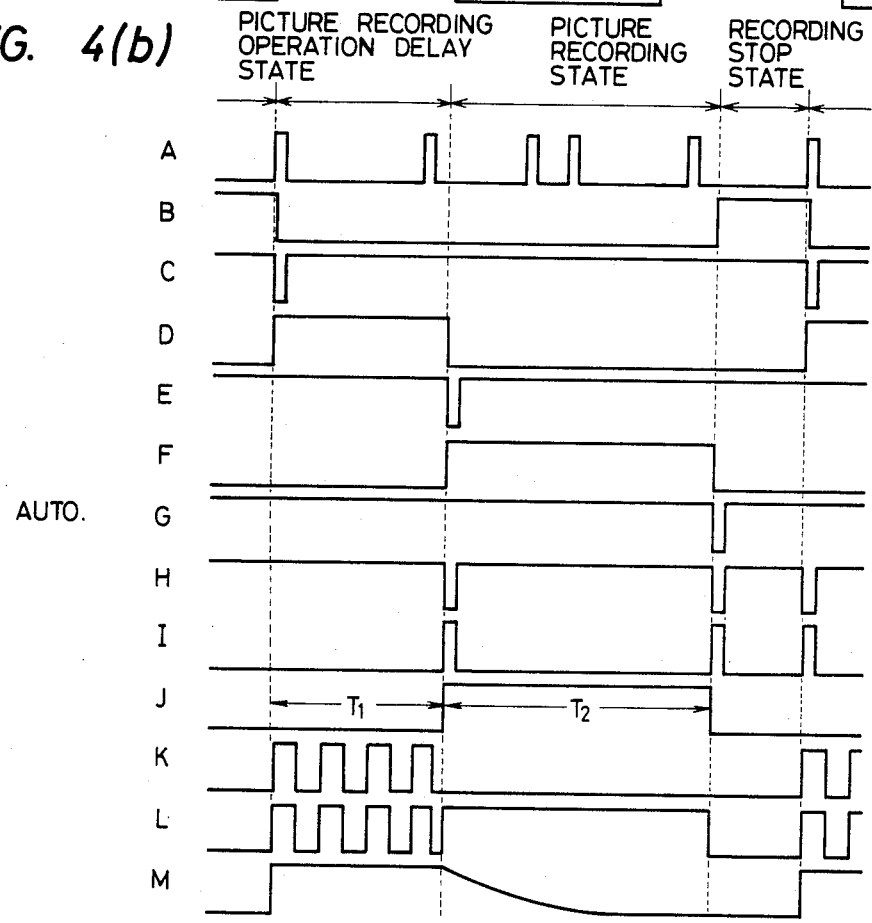

A specific circuit implementation of the above-described embodiment and its operation will be described with reference to FIGS. 3 and 4, of which FIG. 3 is a circuit diagram and FIG. 4 is a timing chart used for a description of the operation of the circuit. In FIG. 3, those components which have been previously described with reference to FIGS. 1 and 2 are similarly numbered. The components not inside a dashed-line box (prior to an inverter 21) form the timer section 3.

The trigger switch 2 is connected to a first pulse generator 7. In FIG. 3, the pulse generator 7 is a differentiator circuit; however, it may be replaced by a Schmitt trigger circuit or clipper circuit. The output terminal of the first pulse generator 7 is connected to one input terminal A of a NAND gate 8, the other input terminal of which is connected to the output terminal of a NOR gate 9. The output terminal C of the NAND gate 8 is connected to the armature of a first switch $SW_1$ of the manual/automatic switch 4. One contact a of the first switch $SW_1$ is connected to the input terminal of a first timer 10, and the other contact b is connected to a contact b of a second switch $SW_2$. The armatures of the first and second switches $SW_1$ and $SW_2$ are operated simultaneously.

The output terminal D of the first timer 10 is connected to the anode of a diode 11 and one terminal of a resistor 12, which are connected in parallel. The cathode of the diode 11 and the other terminal of the resistor 12 are connected to one input terminal M of the NOR gate 9, the other input terminal of which is connected to the output terminal of a second timer 14.

The output terminal D of the first timer 10 is connected to an astable multivibrator (MB) 24 in the display unit 5 and to a second pulse generator 13. The time control terminal CA of the first timer 10 is connected to first RC time constant circuit forming the timer controller 6. By making the resistor $R_1$ a variable resistor which can be controlled externally, the photographer can control the time of the picture recording operation delay state.

The output of the first timer 10 is raised to a high logic level H in response to a negative pulse applied thereto, and is set to a low logical level L in a period of time $T_1$ determined by the associated RC time constant circuit. The first timer 10 may be an IC such as a type ICM 7555 device manufactured by Intersil Co.

The second pulse generator 13 is a conventional differentiator circuit. The output terminal of the second pulse generator 13 is connected to the input terminal of the second timer 14 and to one input terminal of an AND gate 15. As in the case of the first pulse generator, the second pulse generator 13 may be a pulse generator such as a Schmitt trigger circuit or clipper circuit.

The output terminal of the second timer 14 is connected to the other input terminal of the NOR gate 9, and it is further connected to one input terminal of an OR gate 16 in the display unit 5 and to the input terminal of a third pulse generator 17. The time control terminal CA of the second timer 14 is connected to a second RC time constant circuit forming a timer controller 6'. By making the resistor $R_2$ of the timer controller 6' a variable resistor which can be externally controlled, the photographer can control the picture recording time.

As in the case of the first timer 10, the second timer 14 may be an IC such as the type ICM 7555 manufactured by Intersil Co.

The display unit 5 will now be described. The display unit 5 includes the astable multivibrator (MB) 24, the OR gate 16, a driver 18, a resistor 19 and an LED 20. The output terminal of the astable multivibrator (MB) 24 is connected to the other input terminal K of the OR gate 16, the output terminal of which is connected to the driver 18. The output terminal of the driver 18 is connected through the resistor 19 to the anode of the LED 20, the cathode of which is grounded.

The circuit of the display unit 5 is preferably arranged as described above. However, it goes without saying that the circuit may be replaced by any other circuit capable of detecting and displaying the operating states of the timer section 3.

The arrangement of the third pulse generator 17 is the same as that of the second pulse generator 13, and therefore its detailed description will be omitted. The output terminal G of the third pulse generator 17 is connected to the other input terminal of the AND gate 15, the output terminal H of which is connected to a contact a of the second switch $SW_2$.

The armature of the second switch $SW_2$ is connected through an inverter 21 to an input terminal I of a flip-flop 22, the output of which changes state each time an input pulse is applied to the input terminal I. The output terminal J of the flip-flop 22 is connected to the photographing section 1.

In the case of the manual photographing operation, as shown in the part (a) of FIG. 4, the armatures of the first and second switches $SW_1$ and $SW_2$ of the manual-/automatic switch 4 are set to the contacts b, and therefore, when the trigger switch 2 is turned on, a positive pulse, waveform-shaped by the pulse generator 7, is applied to the input terminal A of the NAND gate 8. As the other input terminal B of the NAND gate 8 is maintained at the H level at all times in the manual photographing mode, the positive pulse is applied from the output terminal C of the NAND gate 8 through the first and second switches $SW_1$ and $SW_2$ and the inverter 21 to the input terminal I of the flip-flop 22. As a result, the output terminal J of the flip-flop 22 is maintained in the H state until the application of the next positive pulse, thus allowing the photographing section 1 to perform a picture recording operation. When the trigger switch 2 is turned on again to apply a positive pulse to the flip-flop 22, the latter is reset, as a result of which the output terminal J of the flip-flop is set to L, whereupon the photographing section 1 suspends the picture recording operation.

As is apparent from the above description, whenever the trigger switch 2 is turned on, the output of the flip-flop 22 is in succession H, L, H, L, etc., so that the photographing section 1 repeats operations of picture recording start, picture recording stop, picture recording start, picture recording stop, etc. Thus, starting and stopping the picture recording operations of the photographing section 1 are controlled directly by the trigger switch 2.

In the case of automatic picture recording, as shown in part (b) of FIG. 2, the armatures of the first and second switches $SW_1$ and $SW_2$ of the switch 4 are set to the contacts a, and therefore, when the trigger switch 2 is turned on, the positive pulse from the pulse generator 7 is applied to the input terminal A of the NAND gate 8. In this operation, the other input terminal B of the NAND gate 8 is at H. Therefore, a negative pulse is provided at the output terminal C of the NAND gate 8. The negative pulse is applied through the first switch $SW_1$ to the input terminal of the first timer 10. Thereupon, the output of the first timer 10 is raised to H, returning to L after a period of time $T_1$ set by the timer controller 6. When the output of the first timer 10 is at H, the output terminal E of the second pulse generator 13 is at H, and therefore the second timer 14 is not operated, and the photographing section 1 is thus held in the picture recording operation delay state.

On the other hand, while the ouptut of the first timer 10 is at H, the astable multivibrator (MB) 24 outputs pulses continuously, causing the LED 20 to flicker and thereby indicate the fact that the photographing section 1 is in the picture recording operation delay state.

The H output of the first timer 10 is applied through the diode 11 to the input terminal M of the NOR gate 9, and therefore the output of the NOR gate 9 is at L. Thus, while the output of the first timer 10 is at H, the output of the NOR gate 9 is maintained at L.

The output of the first timer 10 goes to L in the period of time $T_1$ established by the timer controller 6 as described above. In response to the fall of the output of the first timer 10, the second pulse generator 13 applies an L-going pulse to the input terminal of the second timer 14 and to one input terminal of the AND gate 15. In response to this pulse, the output of the AND gate 15 is momentarily set to L. This output is applied through the second switch $SW_2$ and the inverter 21 to the flip-flop 22, whereupon the output of the latter is raised to H, thus permitting the photographing section 1 to perform picture recording. Thus, the picture recording operation is started the period of time $T_1$ after the trigger switch 2 is turned on.

The output of the second timer 14 is raised to H upon the second timer 14 receiving the L-going pulse from the second pulse generator 13, returning to L after a period of time $T_2$ set by the timer controller 6'. While the output of the second timer 14 is at H, the output of the OR gate 16 is also at H, and therefore the LED 20 is maintained turned on to indicate the fact that the photographing section 1 is in the picture recording state. The H output of the second timer 14 is further applied to the NOR gate 9, whereupon the output of the NOR gate 9 is set to L. In the picture recording operation delay mode or in the picture recording operation mode, the other input terminal B of the NAND gate 8 is maintained at L at all times. Therefore, even if the photographer turns on the trigger switch 2 in error when the photographing section is in the picture recording operation delay state or in the picture recording state, the first timer 10 is not operated and the photographing operation is not affected.

In order to prevent the output of the NOR gate 9 from being raised to H during the time interval which elapses from the time instant that the ouptut of the first timer 10 is set to L until the output of the second timer 14 raised to H is applied to the NOR gate 9, a capacitor 23 is connected to the input terminal M of the NOR gate 9. During this time interval, the capacitor is discharged through the resistor 12 so that the high level of the input terminal M of the NOR gate 9 is gradually reduced. Thus, the output of the NOR gate 9 is maintained at L for the aforementioned time interval.

When the output of the second timer 14 is set to L in the period of time $T_2$ established by the timer controller 6', an L-going pulse is applied to the AND gate 15 by the pulse generator 17. As a result, the output of the flip-flop 22 is set to L, and hence the photographing section 1 suspends the picture recording operation the period of time $T_2$ after the start of the picture recording operation. At the same time, one input terminal of the OR gate 16 is set to L, and therefore the LED 26 is turned off, thus indicating the fact that the picture recording operation of the photographing section has stopped. In this operation, one input of the NOR gate 9 is also set to L, and therefore the output thereof is raised to H while the other input terminal B of the NAND gate 8 is also raised to H. Thus, the circuitry is placed in its initial state again.

The automatic photographing device for a video camera according to the invention is simple in construction as described above. Selection can readily be made between the manual photographing mode and the automatic photographing mode merely by operating a switch. When it is desired to perform automatic photographing, merely by turning on the trigger switch the picture recording operation of the video camera is started in the predetermined period of time. Accordingly, the device of the invention allows a timer-controlled photographing operation. Therefore, the photographer too can get into the picture. Thus, according to the invention, the range of application of the video camera is increased.

I claim:

1. An automatic photographing device for a video camera, comprising:
   a photographing section;
   a trigger switch for controlling the start and stop of a picture recording operation of said photographing section;
   switch means for selecting between a manual photographing operation and an automatic photographing operation;
   timer means for establishing for said automatic photographing operation a period of time which elapses from an instant said trigger switch is turned on until a picture recording operating of said photographing section is started and a period of time which elapses from an instant said picture recording operation is started until said picture recording operation is stopped;
   electronic display means responsive to said timer means for indicating operating states of said photographing section;
   said timer means comprises first and second timer devices, a trigger input of said first timer device being coupled to an output of said trigger switch, and a trigger input of said second timer device being coupled through said switch means to a control input of said photographing section;
   said first and second timer devices contprise respective first and second timer controller circuits for establishing said period of time which elapses from an instant said trigger switch is turned on until said picture recording operation of said photographing section is started and said period of time which elapses from said instant said picture recording operation is started until said picture recording operation is stopped, respectively; and
   a first pulse generator circuit coupled between said trigger switch and said trigger input of said first timer device, a second pulse generator coupled between an output of said first timer device and said trigger input of said second timer device, and a third pulse device and said control input of said photographing section.

2. The automatic photographing device of claim 1, wherein said switch means couples an output of said first pulse generator to said control input of said photographing section for said manual photographing operation, and couples said output of said first pulse generator to said trigger input of said first timer device and an output of said third pulse generator to said control input of said photographing section for said automatic photographing operation.

3. The automatic photographing device of claim 2, wherein said display means comprises an astable multivibrator having an input coupled to said output of said first timer section, an OR gate having a first input coupled to an output of said astable multivibrator and a second input coupled to said output of said second timer section; and a light-emitting diode driven in response to an output of said OR gate.

4. The automatic photographing device of claim 3, further comprising gating means operating in response to said outputs of said first and second timer sections for preventing application of said output of said first pulse generator to said trigger input of said first timer section during said period of time which elapses from said instant said trigger switch is turned on until a picture recording operation of said photographing section is started and said period of time which elapses from said instant said picture recording operation is started until said picture recording operation is stopped.

* * * * *